United States Patent [19]

Blum et al.

[11] Patent Number: 4,988,008

[45] Date of Patent: Jan. 29, 1991

[54] SUPPORTING FRAMEWORK FOR A CONTROL CABINET

[75] Inventors: Richard Blum, Dietzenbach; Hans-Michael Groh, Hainburg; Willi Küster, Gelnhausen; Ludwig Schmidt, Frankfurt, all of Fed. Rep. of Germany

[73] Assignee: Siemens Aktiengesellschaft, Berlin & Munich, Fed. Rep. of Germany

[21] Appl. No.: 539,720

[22] Filed: Jun. 18, 1990

[30] Foreign Application Priority Data

Jun. 19, 1989 [DE] Fed. Rep. of Germany ....... 3920353

[51] Int. Cl.$^5$ .............................................. A47F 5/00
[52] U.S. Cl. ..................................... 211/189; 211/26; 211/182; 312/140
[58] Field of Search ................. 211/26, 189, 182, 191; 312/140; 361/415

[56] References Cited

U.S. PATENT DOCUMENTS 3,217,894 11/1965 Shewell ........................... 211/182 X
4,899,892 2/1990 Rheault .............................. 211/26 X Primary Examiner—Robert W. Gibson, Jr.
Attorney, Agent, or Firm—Kenyon & Kenyon

[57] ABSTRACT

A supporting framework for a control cabinet is configured of side frames and cross-beams. The side frames are made of whereby profile elements having a rectangular cross-sectional. The cross-beams possess a square cross-sectional shape that is beveled on one side, and includes two sections at right angles to each other and dimensioned to be of a length corresponding to the longer rectangular side of the cross-sectional shape of the side frame element. The supporting framework is both stable and inexpensive. The cabinets can be attached to one another.

15 Claims, 3 Drawing Sheets

SUPPORTING FRAMEWORK FOR A CONTROL CABINET

BACKGROUND Of THE INVENTION

The present invention relates to a supporting framework for a control cabinet including several geometrically distinct structural elements. In particular, the framework comprises side frame elements that are hollow and open to the interior of the cabinet, and cross-beam elements for connecting the side frame elements to each other. Tracks of punched holes are provided on each type of element for mounting cover panels, doors and built-in components.

The prior art discloses several supporting frameworks of various types. In German Pat. No. DE-C 26 27 260, the supporting framework is composed of individual sections of a single type. This common element is used both for the side frames and the cross-beams connecting the side frames. Separate corner pieces are used to provide fixed screw connections between the elements. Another prior art patent (German Pat. No. DE-A-16 65 984) discloses the use of tracks of holes and structural members. However, the elements used in this device are large and heavy. The combination of side frame parts cross-beams is known in the prior art (DE-C-22 14 538). Other types of prior art devices have been proposed as well (DE-B-11 91 454).

The load bearing capacity of the prior art frameworks is limited. In particular, when one builds such cabinets beyond certain ratios of height to width and height to depth, structural deformations and vibrations tend to occur. To counteract such harmful effects, the structural elements employed must be scaled up in size, particularly, in cross-sectional size. While using thicker elements does enhance the load bearing capacity of such structures, it also greatly increases the structure's weight, thereby making them uneconomical to mass produce. Furthermore, the basic suitability of a supporting framework can also be adversely effected when using structural elements that are very thick, have a large cross section, or require many reinforcements.

Hence, there remains a need for a supporting framework for a control cabinet that is light, requires few materials, is stable, and is suited for mounting a wide range of built in components. Such a device should offer ease of connection to other identical control cabinets, as well as easily accessible mounting and connection points.

SUMMARY OF THE INVENTION

The present invention meets this need is avoids the problems and disadvantages of the prior art by providing a support framework utilizing two types of structural elements. The descriptions for the positions of sections or parts such as "side", "inside", "outside" are to be taken relative to the finished supporting framework. A first type of structural element is used for forming side frames. A second type of structural element is used for forming cross-beams connecting the side frames to each other.

When viewed in cross-section, the side frame elements have a generally rectangular form. The short sides of this rectangular form lie in planes parallel to the front and back surfaces of the completed cabinet, and the long sides of the rectangular form are parallel to the side walls of the cabinet. The outer long side of the side frame element bears at least two flat external sections, separated from each other by an indentation. One of these two flat sections is contiguous to the outer edge of the section. The second flat section is set back from the first flat section.

The side frame elements actually form an incomplete rectangle when viewed in cross-section, because on their inner long side, they are seen to be hollow—i.e., instead of a continuous long wall as is found on the outer portion, the inner long side of the section shape is defined by two spaced apart shanks lying in a common plane, defining a gap therebetween.

The side frame elements are connected to each other by cross-beam elements. These cross-beam elements are shaped differently than the side frame elements. In cross-section, they have a generally square shape, bevelled on one side. The cross-beam elements comprise two orthogonal sections of equal length, dimensioned to mate with the inner rectangular section of the side frame elements. Adjoining each of these orthogonal sections are two shorter sections with which they likewise form right angles. To these shorter sections are attached additional shanks set at an angle of approximately 45 degrees. These angled sections give the cross-beam element a beveled, open appearance.

The use of two types of structural elements enhances the stability of the supporting framework. This stability is due in part to the manner in which loads are transferred between side frame elements and cross-beam elements. These elements meet at what is known as a line of connection, i.e., that surface along which loads are transferred between elements. By using two different elements of the disclosed geometry, a line of connection between the side frames and the cross-beams is created that is longer than it would be if only a single structural element of the side frame type were used throughout. In effect, this invention enables a supporting framework to be built that distributes loads across a greater surface area than is the case for prior art schemes. The stability of the supporting framework is further enhanced by dimensioning the right-angled shorter sections of the cross-beam elements so that they are as wide as the shanks of the side frame elements. This system of construction is effective for use with a wide variety of connection techniques, i.e., welding, adhesion, or bolting. These and other advantages more than compensate for having to manufacture the structural elements in two shapes, especially when the elements are manufactured in large quantity.

The outer, long sides of the side frame elements can comprise a total of three flat sections, each spaced from the plane of the other two flat surfaces by bends in the wall of the outer surface. Thus, a total of three flat surfaces are available, the outer-most of which can be used as a stop face for an adjoining assembly of control cabinets. The other flat sections can be used to support covering panels or reinforcements.

The use of different structural elements for forming side frames and cross-beams makes it possible to use relatively light weight, thin walled sections. This facilitates the provision of holes for mounting purposes. The utility of the framework is further enhanced by the provision of tracks of punched holes along the surface walls of the structural elements. Where the holes are used to accommodate mounting bolts, aligned pairs of holes in opposite sides of the structural elements are provided. Such aligned holes can be used as through passages for bolts or threading screws. They can be arranged to alternate with square holes, which can be used to facilitate mounting built-in units. The built-in unit can first be made to engage the rectangular holes by means of appropriate projections emanating from the unit and mating with these rectangular holes. This enables one to position the unit for mounting, distributing the weight of the unit over the framework. The round holes may then be used for the final attachment of the unit, as by inserting threading bolts through aligned pairs of round holes. Because the final attachment bolts need not take up the load of the unit (this load having already been absorbed through the rectangular mounting structure), the final mounting is greatly simplified. As a further refinement, the side frame sections can be provided with two tracks of round holes of differing size, each track offset laterally from the other. The offset spacing can be one half the inter-hole spacing along a track, or one half the diameter of either hole. The smaller holes can be used for securing frame joint parts or the like, and the larger holes can be used for accommodating heavier connecting bolts. Such tracks of punched holes can be used, for example, on the front side of the supporting framework for mounting doors, and on the rear side for accommodating covering panels. Another track of punched holes can be used on the rear face of the supporting framework for connecting two control cabinets back-to-back.

The cross-beam elements can have tracks of punched holes in both the shorter sides and in the angled shanks contiguous thereto. The holes may also be placed along the long sides of the cross-beam elements. Where holes are placed along the angled shank portions, they are spaced at approximately twice the width of the spacing between holes along adjacent sections. This double spacing enables one to provide the angled shank portions with cut-out recesses. Such recesses make it easier to access the tracks of punched holes in the adjoining sections.

DETAILED DESCRIPTION

Figure 1:
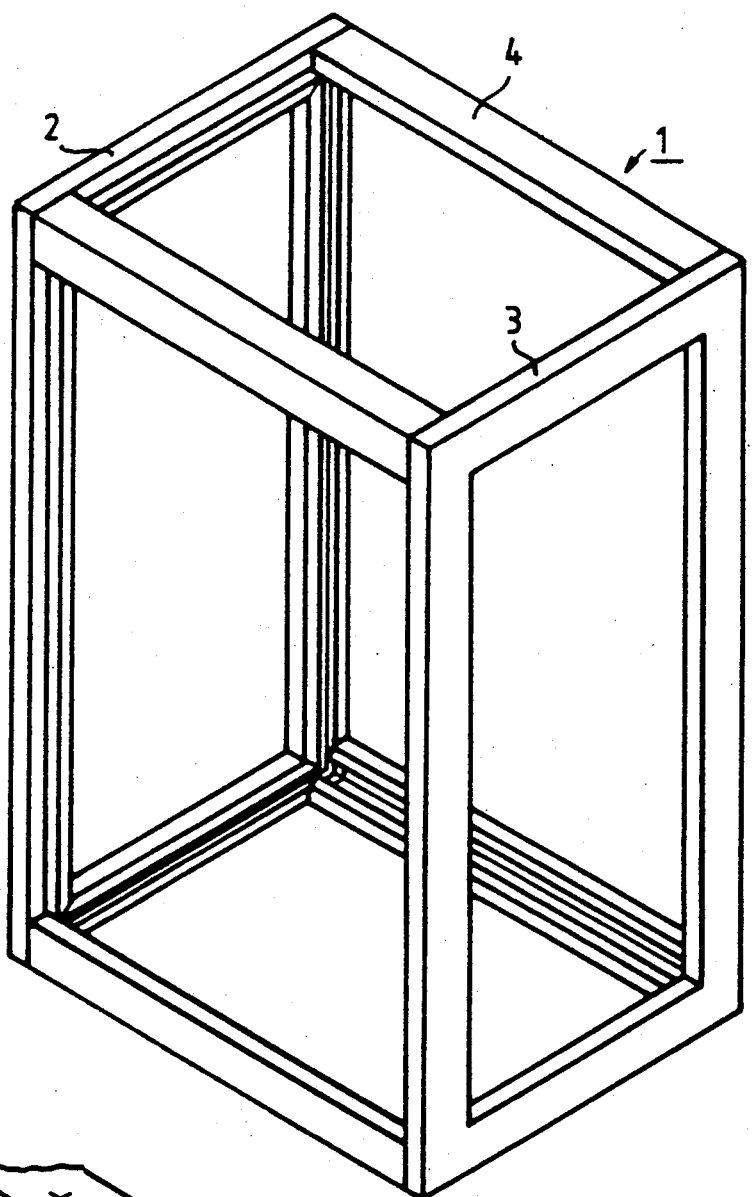
FIG. 1 is a schematic illustration of a supporting framework for a control cabinet constructed according to the principles of the invention.

FIG. 1 shows supporting framework 1, which is a load bearing part of a control cabinet. This is comprised of side frames 2 and 3 as well as cross-beams 4. The side frames 2 and 3 have a generally rectangular cross sectional shape. The cross-beams 4 are generally square in cross section, and beveled on one corner. The supporting framework 1 is composed of the two side frames 2 and 3 coupled together by the cross-beams 4. The coupling of these parts can be either detachable or undetachable (for example, the latter as a result of welding). By using cross-beams of a geometric configuration that provides a longer and more balanced contact area with the side frames, the stability of the supporting framework is enhanced.

Figure 2:
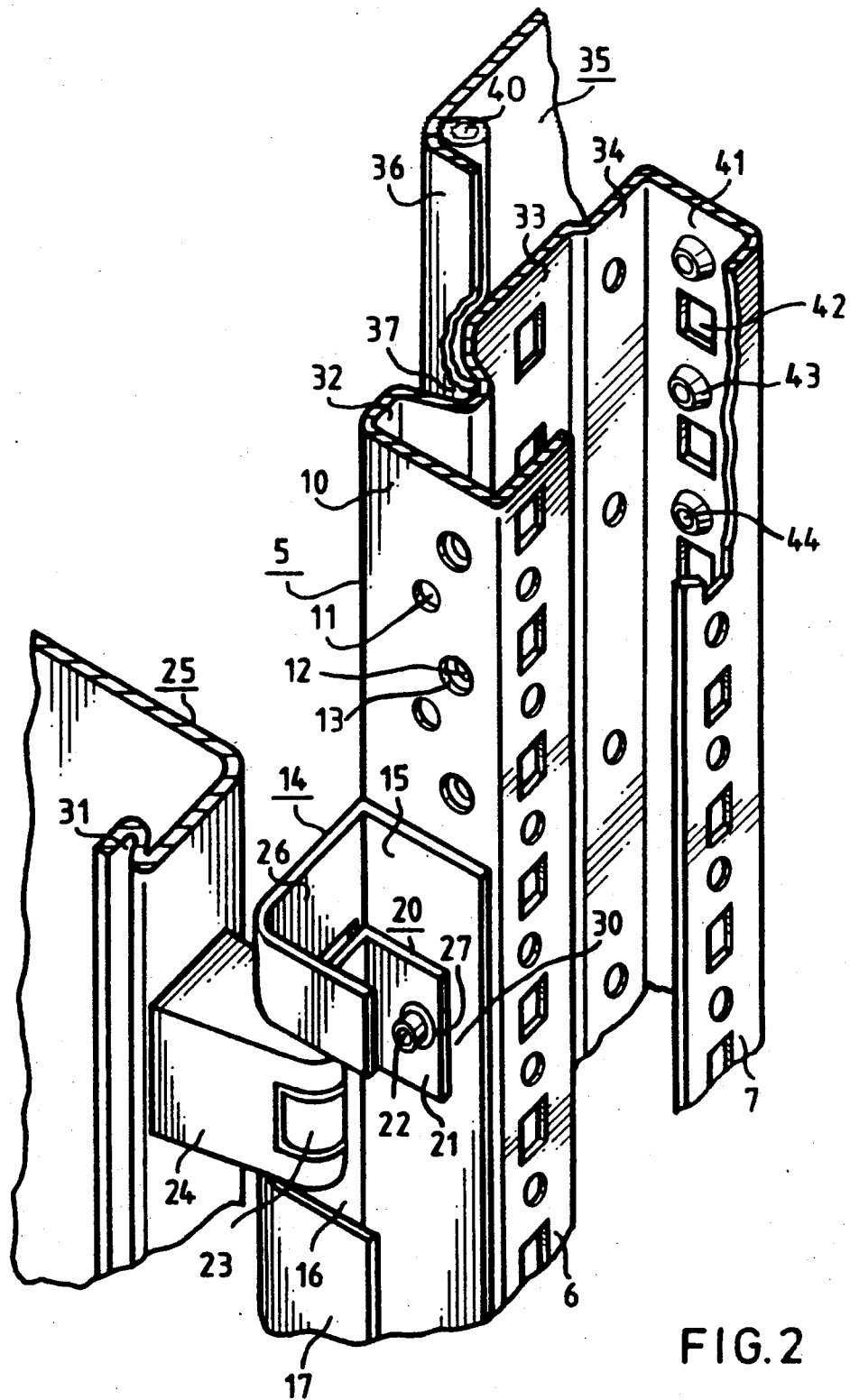
FIG. 2 is a detailed perspective view of a side frame element attached door.

A section of an element used for the side frames is depicted in greater detail in FIG. 2. Side frame element has a shape of an open rectangle, whereby a first long side of the rectangle comprises three offset flat surfaces 2, 33, and 34. Surfaces 32 and 43 terminate in front and rear surfaces 10 and 41 respectively. Front and rear surfaces 10 and 41 form the short sides of the rectangle, and are contiguous with shank portions 6 and 7 which in turn form an open wall parallel to surfaces 32, 33 and 34. Shanks 6 and 7 define a hollow space into which various bolts may be placed. The opening of the side frame section is thus turned toward the inside space of the control cabinet. The front side 10 is formed by flat section, in which are arranged holes 11 and 12. Holes 12 may be in alignment with corresponding holes located along the rear side 41. Holes 11 and 12 are further arranged as parallel tracks along the front element, offset laterally from each other as noted above.

To mount a door, a strip 14 of substantially U-shaped cross section is mounted on the front section 10 of the element 5. The shanks 15 of the strip 14 are turned toward the front section 10 and cover the holes 11 and 12. Situated in a parallel side recess 16 and the front shank 17 of the strip 14, opposite the shank 15 is a hinged angled clip 20, whose base 21 is attached to the element 5 by means of a screw 22. The strip 14 is secured in this manner to the side frame element 5. The hinged angle clip 20 has a lug 23 for the hinged arm 24 of a door 25. As shown, when the recess 16 of the strip 10 is suitably designed, the door 25 can be opened up to 180 degrees, reaching into the crosspiece 26 of the strip 10.

The front edge 27 of the base 21 of the hinged angle clip 20 is set back from the front edge of the shank 15 of the strip 14 in such a way that a marginal strip 30 remains. This may be used as a bearing arrangement for the door 25, with a further connection being made between the edge portion of the strip and door groove 31.

On its lateral outer surface, side frame element 5 comprises three flat sections 32, 33 and 34 which lie on spaced apart parallel planes. The narrow flat section 32 adjacent to the front outer edge of the frame serves as a stop face for the neighboring assembly of control cabinets, as shall be explained later with reference to FIG. 4. The additional sections 33 and 34 are spaced inwardly from the outer section 32, so that covering panels or reinforcements can be mounted upon them without projecting over flat section 32. In FIG. 2, a lateral covering panel 35 engages an indentation 37 separating flat wall 33 from flat wall 32. A tube-shaped joint 40 is situated between the inner shank of the indentation 37 and the inner surface of the angled portion 36 of covering panel 35.

The rear section 41 of side frame 5 lies in a plane parallel to the front section 10. As with the shanks 6 and 7, this section contains tracks of punched holes 42 alternating with round holes 44. The round holes may be placed so as to be in alignment with the round holes of the front section 10. With such tracks of punched holes, one is able to secure at the outset relatively heavy built in components in a weight relieving manner. The final step of fastening threading screws into place completes the mounting procedure.

Figure 3:
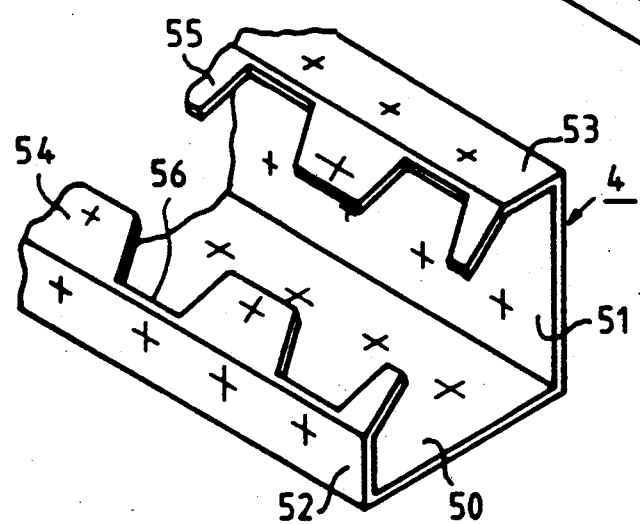
FIG. 3 is a view of the cross-beam element.

The second of the two basic elements used to build the supporting framework is illustrated in FIG. 3. It is seen to have the cross section of a square which has been beveled at one corner. In particular, orthogonal sections 50 and 51 of equal length are joined along a common line. These sections terminate in shorter orthogonal sections 52 and 53. These shorter sections terminate in beveled portions 55 and 54, into which have been placed evenly spaced cutouts 56. These angled shanks are bent at an angle of approximately 45 degrees. The shorter sections and 53 are dimensioned so as to properly mate with shanks 6 and 7. Sections 50 through 55 of the cross-beam 4 are provided with holes of a suitable form and spacing. The spacing of holes along shanks 54 and 55 is approximately twice that of the spacing along the adjacent sections so as to accommodate the cutouts. In this manner, the holes in the sections 52 and 53 are easily accessible.

Figure 4:
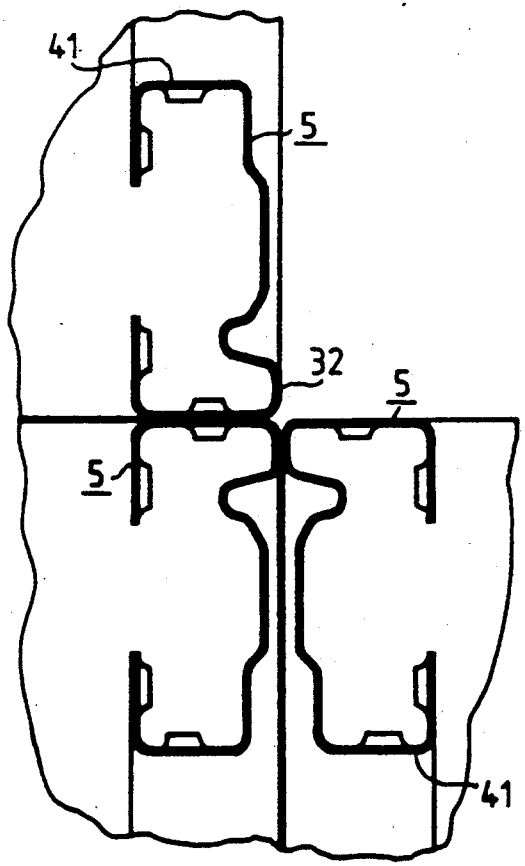
FIG. 4 is a sectional view along a plane perpendicular to the side frames of the three contiguous control cabinets.

The side frames 3 are constructed so as to facilitate the mounting of adjoining cabinets. This is seen in FIG. 4, where faces 10 and 33 are mounted touching each other. Holes in sections 10 and 32 are aligned with their counterparts in adjacent frameworks to enable one to make the appropriate connections between cabinets.

Figure 5:
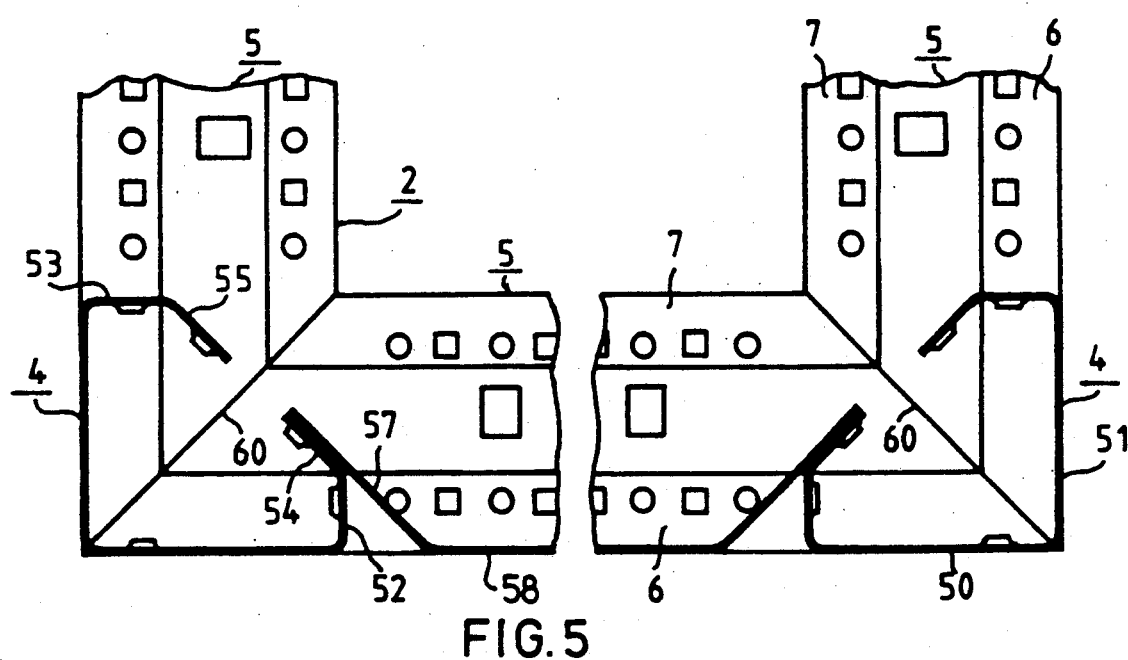
FIG. 5 is a sectional view of the supporting framework o invention connected to a base plate.

The shape of the cross-beams 4 is advantageous in mounting the lower and/or upper covering panels. The covering panels may consist of flat sections 58 that terminate in angled portions 57. The angled portions are adapted to mate with the beveled portions 54 and 55 of the cross-beams. Attachments between the beveled portion of the covering and the beveled portion of the cross-beam are made through overlying holes. The remaining space within the cross-beams can be used for the placement of power lines, control wires, and other lines. This configuration is depicted in FIG. 5, where one sees that elements 50–55 are connected along their entire length with the shanks 6 of the side frame elements 5. The elements 5 meet in the corners of the side frames 2 and 3 along a mitering of 45 degrees. The cross-beams bridging this boundary portion relieve some of the stress in this mitered region.

Various methods can be used to connect the side frames with the cross-beams. The relatively large contact area utilized reduces stresses caused by mounting built-in units within the cabinet. In addition to the various well known welding methods for permanently attaching the structural elements to one another, other methods of permanent attachment can be employed with success. For example, a permanent connection can be established using thermo-setting, two-component adhesives.

What is claimed is:

1. A supporting framework for a control cabinet, comprising:
   (a) frame elements of a first type for use as side frame pieces, said side frame pieces forming side frames of the control cabinet, said frame elements of the first type having a generally rectangular cross-sectional form comprising longer inner and outer lateral sides and shorter front and back sides, and an opening in the inner, longer side defined by two shanks;
      said side frame elements of the first type further having at least two flat surface sections provided on the longer outer lateral side opposite said opening, said flat surfaces lying on parallel, spaced apart planes separated from each other by at least one indentation, said at least two flat sections being disposed one behind the other, one of the flat sections being contiguous with one of the front and back sides;
   (b) frame elements of a second type for forming cross-beams of the control cabinet, said frame elements of the second type connecting said side frames to each other, said frame elements having a generally square cross-sectional form beveled on one corner and comprising:
      a first pair of orthogonal sections of equal length as wide as the longer lateral sides of the side frame elements;
      a second pair of shorter sections, each shorter section being adjacent and orthogonal to one of the first pair of orthogonal sections;
      shanks contiguous with the shorter sections set at an angle of approximately 45° with respect thereto, and which define an opening therebetween; and
   (c) tracks of holes within at least one of said first and second type of frame elements for mounting covering panels, doors, and built-in units.

2. The supporting framework of claim 1, wherein the outer long side of the side frame element comprises a third flat surface section set back from the plane of the second, middle flat surface section.

3. The supporting framework according to claim 1, wherein the second pair of orthogonal shorter sections of the cross-beam elements are dimensioned to be as wide as the opening-defining shanks of the side frame elements.

4. The supporting framework according to claim 1, wherein at least some of the holes along the tracks of holes situated on the frame elements are in alignment with corresponding holes situated along the opposite side of the frame element.

5. The supporting framework according to claim 4, wherein first holes are provided with aligned holes on the opposite side of the framework and are used for screwing in threading screws, and second rectangular holes are provided without aligned holes, said first and second holes being configured to alternate with each other.

6. The supporting framework according to claim 1, wherein the front short side of the generally rectangular side frame elements comprises two tracks of punched holes displaced from each other by half a spacing and said two tracks are offset laterally from each other.

7. The supporting framework according claim 1, wherein the cross-beam elements have tracks of punched holes in their orthogonally disposed walls as well as in their opening-defining angles shanks, the holes along the angled shanks being spaced twice as far apart as the holes along tracks of adjacent sections; and recesses are cut into the space between the holes along the angled shanks.

8. The supporting framework according to claim 2, wherein at least some of the holes along the tracks of holes situated on the frame elements are in alignment with corresponding holes situated along the opposite side of the frame element.

9. The supporting framework according to claim 8, wherein first holes are provided with aligned holes on the opposite side of the framework are used for screwing in threading screws, and second rectangular holes are provided without aligned holes, said first and second holes being configured to alternate with each other.

10. The supporting framework according to claim 2, wherein the front short side of the generally rectangular side frame elements comprises two tracks of punched holes displaced from each other by half a spacing and said two tracks are offset laterally from each other.

11. The supporting framework according claim 2, wherein the cross-beam elements have tracks of punched holes in their orthogonally disposed walls as well as in their opening-defining angles shanks, the holes along the angled shanks being spaced twice as far apart as the holes along tracks of adjacent sections; and
recesses are cut into the space between the holes along the angled shanks.

12. The supporting framework according to claim 3, wherein at least some of the holes along the tracks of holes situated on the frame elements are in alignment with corresponding holes situated along the opposite side of the frame element.

13. The supporting framework according to claim 12, wherein first holes are provided with aligned holes on the opposite side of the framework are used for screwing in threading screws, and second rectangular holes are provided without aligned holes, said first and second holes being configured to alternate with each other.

14. The supporting framework according to claim 3, wherein the front short side of the generally rectangular side frame elements comprises two tracks of punched holes displaced from each other by half a spacing and said two tracks are offset laterally from each other.

15. The supporting framework according claim 3, wherein the cross-beam elements have tracks of punched holes in their orthogonally disposed walls as well as in their opening-defining angles shanks, the holes along the angled shanks being spaced twice as far apart as the holes along tracks of adjacent sections; and
recesses are cut into the space between the holes along the angled shanks.

* * * * *